Sept. 11, 1951 — L. J. DAHLINE — 2,567,876
ELECTRONIC CIRCUIT
Filed Dec. 9, 1948 — 3 Sheets-Sheet 1

Inventor
LAWRENCE J. DAHLINE
By George H. Fisher
Attorney

Sept. 11, 1951      L. J. DAHLINE      2,567,876
ELECTRONIC CIRCUIT

Filed Dec. 9, 1948      3 Sheets-Sheet 2

Inventor
LAWRENCE J. DAHLINE

George H. Fisher

Attorney

Sept. 11, 1951  L. J. DAHLINE  2,567,876
ELECTRONIC CIRCUIT
Filed Dec. 9, 1948  3 Sheets-Sheet 3
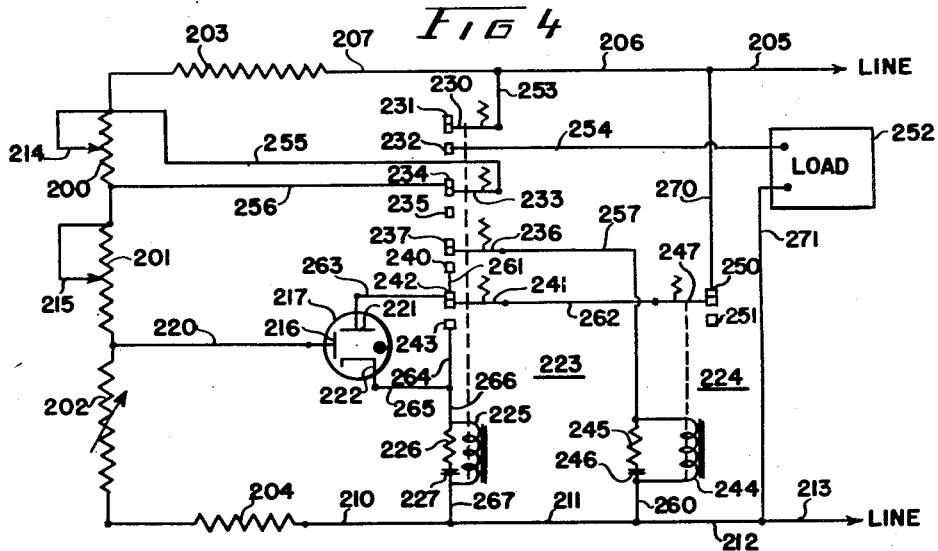
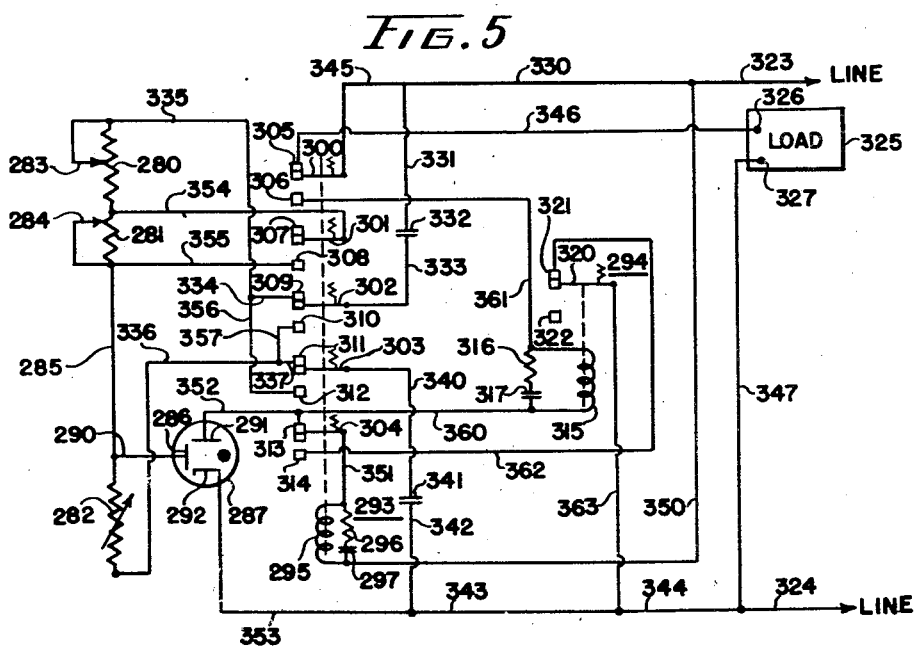
INVENTOR.
LAWRENCE J. DAHLINE
BY
George H. Fisher
ATTORNEY Patented Sept. 11, 1951

2,567,876

UNITED STATES PATENT OFFICE 2,567,876

ELECTRONIC CIRCUIT

Lawrence J. Dahline, Minneapolis, Minn., assignor to Minneapolis-Honeywell Regulator Company, Minneapolis, Minn., a corporation of Delaware Application December 9, 1948, Serial No. 64,348

14 Claims. (Cl. 175—320)

1

This invention relates to electronic circuits and in particular to those electronic circuits wherein momentary energization of electron discharge means continuously energizes a controlled circuit. It is therefore an object of the invention to devise an improved circuit of this type.

Another object of the invention is to devise such a circuit of this type wherein deenergization of the controlled circuit is effected by a second momentary energization of said discharge means.

Another object of the invention is to devise such a circuit wherein either energization or deenergization of the controlled circuit operates to deenergize the discharge means.

Another object of the invention is to devise such a circuit wherein gas filled tubes may be used to advantage.

An advantage of this type of circuit wherein gas filled tubes are used is that upon energization of a gas filled tube a sufficient electron flow is immediately passed to completely energize or deenergize the controlled circuit.

Another advantage of this type of circuit is that the tubes used have a long life expectancy because they are energized only momentarily.

These and other objects and advantages will be apparent from the following description and drawings in which:

Figure 4 shows a modification of the invention utilizing a single tube and two relays in which the connections of the tube to the power source are reversed; and Figure 5 shows a modification of the invention utilizing a single tube and two relays in which the connections of the voltage divider, used as a signal source, to the power source are reversed.

Figure 1:
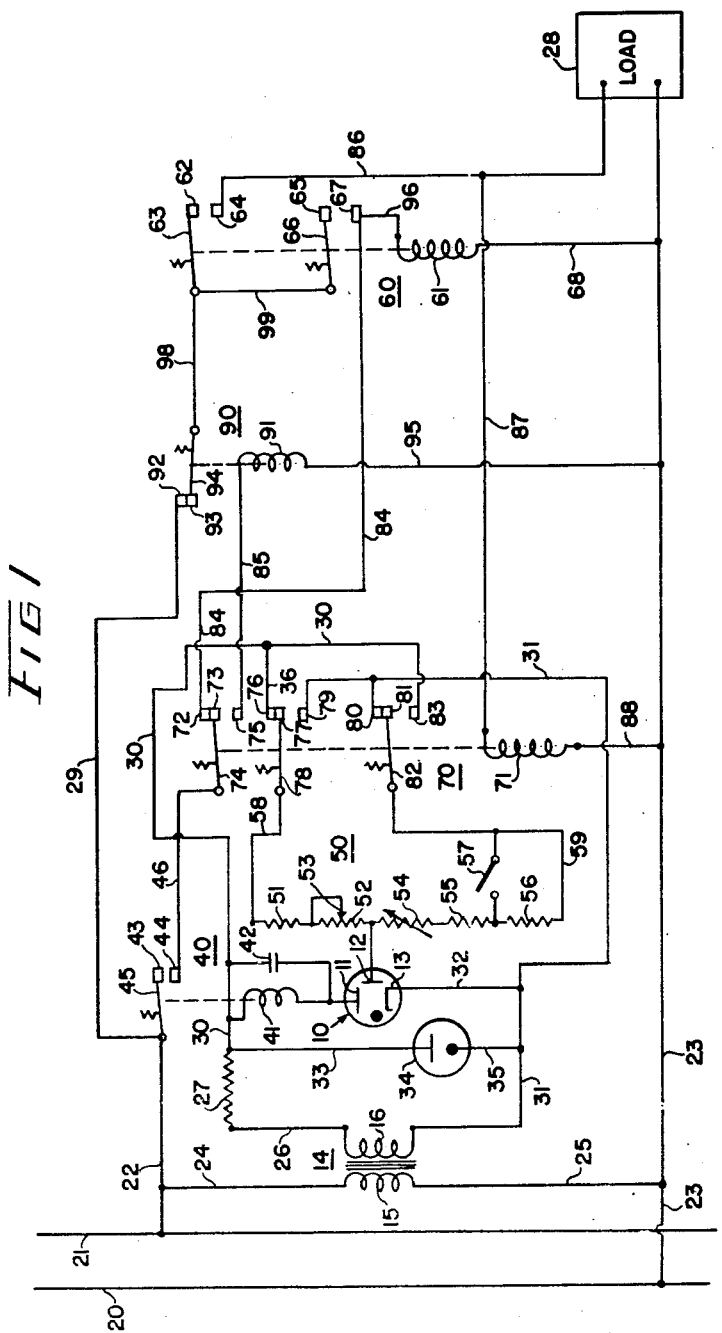
Figure 1 shows one form of the invention utilizing a single tube and four relays for both energizing and deenergizing the controlled circuit.

In the circuit of Figure 1 the single tube is energized by a signal from a voltage divider. Firing of the tube energizes a first relay which closes the energizing circuit to a second relay. The second relay, upon being energized, establishes its own holding, or energizing, circuit and further closes the energizing circuit to a third relay. Energization of the third relay reverses the connections of the voltage divider to the line, or power source, resulting in deenergization of the tube and consequent deenergization of the first relay. Due to the establishment of the holding circuit for the second relay, however, the second and third relays remain energized. When the controlling point of the voltage divider again reaches the value to cause the tube to fire, the first relay is again energized and, due to new circuits closed through energization of the third relay, causes a fourth relay to be energized. Energization of the fourth relay opens the holding circuit of the second relay, deenergizing the second relay and thus the third relay to again reverse the connections of the voltage divider with respect to the line to deenergize the tube and thus the first and then the fourth relays to place the entire system in its original completely deenergized position.

In the circuit in Figure 1 a gas filled tube 10, having an anode 11, a starting anode 12 and a cathode 13 is supplied with an anode to cathode potential from a transformer 14 having a primary winding 15 and a secondary winding 16. The primary winding 15 of transformer 14 is supplied with line voltage from leads 20 and 21 as follows: from lead 21 through leads 22 and 24, transformer primary winding 15, leads 25 and 23 to lead 20. The voltage across secondary 16 is of the order of 325 volts.

A first relay 40 has a winding 41 with a condenser 42 in parallel therewith for keeping winding 41 energized upon alternate half cycles when tube 10 is not conducting, a fixed contact 44, and a movable contact 43 on an arm 45 for making electrical connection with fixed contact 44 upon energization of winding 41. The movable contact is biased out of engagement with contact 44 to separate therefrom during deenergization of winding 41.

A second relay 60 has a winding 61, a movable contact 62 on arm 63 for making electrical connection with a fixed contact 64, and a movable contact 65 on an arm 66 for making electrical connection with a fixed contact 67. The movable contacts 62 and 65 are biased out of engagement with contacts 64 and 67 to separate therefrom during deenergization of winding 61.

A third relay 70 has a winding 71, fixed contacts 72 and 75, a movable contact 73 on arm 74 to make electrical connection with either fixed contact 72 or fixed contact 75, fixed contacts 76 and 79, movable contact 77 on arm 78 to make electrical connection with either fixed contact 76 or fixed contact 79, fixed contacts 80 and 83, and a movable contact 81 on arm 82 to make electrical connection with either fixed contact 80 or fixed contact 83. The movable contacts 73, 77 and 81 are biased out of engagement with contacts 75, 79 and 83 respectively to separate therefrom and to make electrical connection with contacts 72, 76 and 80 respectively during deenergization of winding 71.

A fourth relay 90 has a winding 91, a fixed contact 92 and a movable contact 93 on an arm 94 to break connection with fixed contact 92 upon energization of winding 91. The movable contact 93 is biased to make engagement with contact 92 during deenergization of winding 91.

A voltage divider 50 has a limiting resistor 51, a balancing resistor 52 having a movable contact 53 for shorting out a portion thereof, a signal device, considered in the present description as a relative humidity element 54, a current limiting resistor 55, and an unbalancing resistor 56 the magnitude of which can vary depending on the regulation desired. The unbalancing resistor 56 have a switch 57 in parallel therewith. Relative humidity element may be, though not necessarily must be, of the type disclosed in the patent to Dunmore, Number 2,285,421. The resistance of the element may vary from 50,000 ohms to 2 megohms, depending upon the humidity. Resistor 52 is adjusted so that tube 10 fires when the humidity reaches one of the desired limiting values. With the relays all deenergized, as shown, the voltage divider 50 is energized from transformer 14 as follows: from transformer secondary winding 16, through lead 26, resistor 27, leads 30 and 36, fixed contact 76 of relay 70, movable contact 77 on arm 78, lead 58, resistors 51, 52, 54, 55 and 56, lead 59, movable arm 82 and movable contact 81 on arm 82 forming part of relay 70, fixed contact 80, lead 31, and back to transformer secondary winding 16.

A load 28 may be placed across line voltage leads 20 and 21 by the following circuit from line voltage lead 21 through leads 22 and 29, relay contacts 92 and 93, lead 98, relay contacts 62 and 64, lead 86, load 28, and lead 23 to line voltage lead 20. The load may be of such type as to control the condition to which the relative humidity element is responsive.

The plate to cathode potential of tube 10 is supplied from transformer secondary 16 through lead 26, resistance 27, lead 30, relay winding 41 of relay 40, plate 11, cathode 13, leads 32 and 31 and back to the transformer secondary winding 16. A voltage regulator 34 is placed in parallel with relay winding 41 and tube 10 and is connected to lead 30 through lead 33 and to lead 31 through lead 35.

Values of components used in a successfully operated model are:

Resistor 27 _____ ohms__ 5000
Resistors 51, 55 _____ Kilohms__ 27
Resistor 52 _____ megohms__ 2
Capacitor 42 _____ microfarads__ 2
Tube 10 _____ OA4G
Tube 34 _____ VR150

Operation of species of Figure 1

The operation of this circuit is as follows.

When a satisfactory humidity condition is present the circuit is as shown in the drawing, that is, with all the relays in their deenergized position, and thus no voltage is applied to the load 28. Upon the relative humidity decreasing below a permissible value tube 10 will fire. This is due to the increased resistance of relative humidity element 54 which raises the potential of the starting anode 12 with respect to cathode 13. When the tube 10 is energized, relay winding 41 will be energized, closing the contacts 43 and 44.

When contacts 43 and 44 are closed, relay winding 61 is energized by the following circuit: from power source lead 21 through lead 22, arm 45, movable contact 43, fixed contact 44, lead 46, arm 74, movable contact 73, fixed contact 72, lead 84, fixed contact 67, lead 96, relay winding 61, leads 68 and 23 to power source lead 20.

When relay winding 61 is energized, relay contacts 62 and 64 and 65 and 67 are closed. Closing of contacts 62 and 64 energizes the load 28 from the source through the previously described circuit. Closing of contacts 65 and 67 establishes a holding circuit for energizing relay winding 61 by the following path: from power source lead 21 through leads 22 and 29, fixed contact 92, movable contact 93, arm 94, leads 98 and 99, arm 66, movable contact 65, fixed contact 67, lead 96, relay winding 61, and leads 68 and 23 to power source lead 20.

Closing of contacts 62 and 64 also energizes relay winding 71 by the following circuit: from power source lead 21 through leads 22 and 29, fixed contact 92, movable contact 93, arm 94, lead 98, arm 63, movable contact 62, fixed contact 64, lead 86, lead 87, relay winding 71, and leads 88 and 23 to power source lead 20. Energization of relay winding 71 breaks electrical connection between contacts 72 and 73, 76 and 77, and 80 and 81 and closes contacts 73 and 75, 77 and 79, and 81 and 83. Breaking the connection between contacts 77 and 76 and contacts 81 and 80 and making connection between contacts 77 and 79 and contacts 81 and 83 reverses voltage divider 50 with respect to tube 10. With the relay windings previously deenergized the upper end of voltage divider 50 had been connected to anode 11 of tube 10 through lead 58, contacts 77 and 76, leads 36 and 30 and relay winding 41 while the lower end of the voltage divider had been connected to cathode 13 through lead 59, contacts 81 and 80, and leads 31 and 32. With contacts 76 and 77 and 80 and 81 broken and contacts 77 and 79 and 81 and 83 closed the upper end of the voltage divider is connected to the cathode through lead 58, contacts 77 and 79 and leads 31 and 32 while the lower end of the voltage divider is connected to the anode through lead 59, contacts 81 and 83, lead 30 and relay winding 41. This reversal of the voltage divider places the potential of the starting anode 12 negative with respect to the potential of cathode 13 at the instant of reversal and deenergizes tube 10. It is important to note that tube 10 has been energized only instantaneously and has been deenergized due to the reversal of the voltage divider connections upon energization of relay winding 71. Thus the connection between contacts 43 and 44 is broken and relay winding 91 remains deenergized.

Deenergization of tube 10 deenergizes relay winding 41 breaking the connection between contacts 43 and 44. As has been noted, however, relay winding 61, upon being energized established a holding circuit to continue the energization of relay winding 61 through a path by-passing relay contacts 43 and 44.

With the load 28 now energized and operating to increase the relative humidity the resistance of the relative humidity element 54 is decreased to eventually bring the potential on the starting anode 12 sufficiently positive with respect to the potential on cathode 13 so that tube 10 will again fire. This firing of tube 10 reenergizes relay winding 41 and closes contacts 43 and 44. A circuit is now completed from power source lead 21 through lead 22, arm 45, movable contact 43, fixed contact 44, lead 46, arm 74, movable contact 73, fixed contact 75, lead 85, relay winding 91, and leads 95 and 23 to power source lead 20.

This energization of relay winding 91 breaks the connection between the fixed contact 92 and movable contact 93. Breaking of this connection breaks the holding circuit energizing relay winding 61, deenergizing relay winding 61 and opening the circuit to the load 28. Breaking the connection between contacts 62 and 64 also breaks the circuit energizing relay winding 71, permitting the movable contacts 73, 77 and 81 to return to their original deenergized position. This again reverses the voltage divider, dropping the potential on starter anode 12 below that potential on the cathode 13 and deenergizing tube 10. Breaking of the connection between contacts 73 and 75 breaks the energizing circuit of relay 90. Deenergization of tube 10 again deenergizes relay winding 41 and effects breaking of the connection between contacts 43 and 44 and the circuit is again in its original completely deenergized position.

Figure 2:
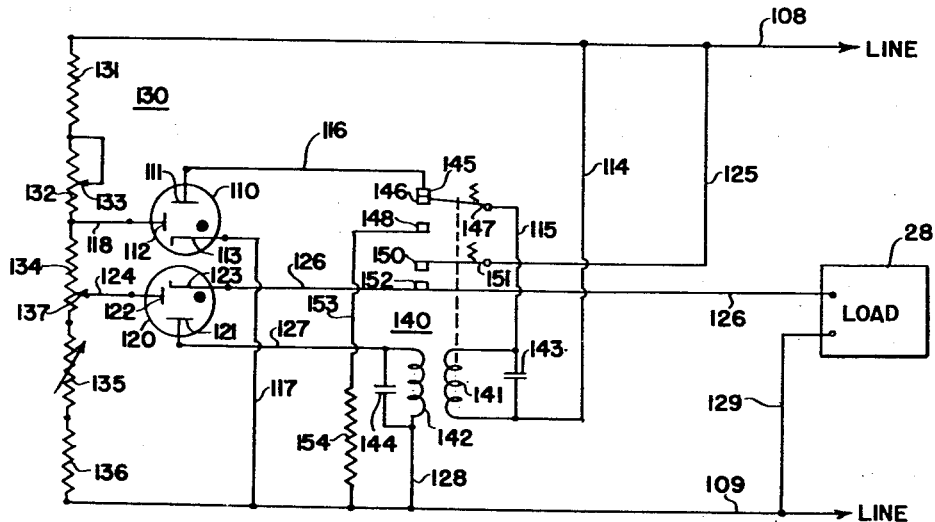
Figure 2 shows a modification of the invention utilizing separate tubes for energization and deenergization of the controlled circuit and using a single relay having a first winding and a "bucking" winding.

Modification of Figure 2

In Figure 2 two gas filled tubes, 110 and 120 are used. Both tubes receive their signals from a single voltage divider 130. Upon one of the controlling points of the voltage divider reaching a predetermined value a first tube will fire, energizing one winding of the relay. Energization of this relay winding closes the energizing circuit to the load, establishes its own holding circuit and, in addition, breaks the energizing circuit to the first tube and closes the energizing circuit to the second tube. Energization of the load results in its operation to change the humidity condition and change the controlling point of the voltage divider which is effective upon the second tube to a predetermined value which causes the tube to fire. Firing of the second tube results in energization of the bucking winding in the relay to cancel the effect of the first winding and deenergize the relay to place the entire circuit in its original deenergized position.

A voltage divider 130 having a current limiting resistor 131, a calibrating resistor 132 having a movable contact 133 for shorting out a portion thereof, a differential adjustment resistor 134, a relative humidity element 135 and a current limiting resistor 136 is connected across the line through leads 108 and 109.

Tube 110 has an anode 111, a starting anode 112 and a cathode 113. Tube 120 has an anode 121, a starting anode 122 and a cathode 123.

A relay 140 has a relay winding 141 and a second relay winding 142 which is called a "bucking" winding because when energized winding 142 counteracts the effect of winding 141 and relay 140 is in effect deenergized. Condensers 143 and 144 are in parallel with relay windings 141 and 142 to hold windings 141 and 142 energized during the alternate half cycles when tube 120 is not conducting. A movable contact 146 on arm 147 makes connection to fixed contact 145 through spring bias when the relay 140 is deenergized and to fixed contact 148 when the relay 140 is energized. A movable contact 150 on arm 151 makes contact with fixed contact 152 when the relay 140 is energized and is biased out of engagement with contact 152 to separate therefrom upon deenergization of winding 141 or energization of "bucking" winding 142.

When the relay 140 is deenergized a potential is placed across the plate and cathode in tube 110 through the following circuit: from power lead 108 through lead 114, relay winding 141, lead 115, movable arm 147, movable contact 146, fixed contact 145, lead 116, plate 111, cathode 113 and lead 117, to power lead 109. Connection to starting anode 112 is by lead 118 to a point on the voltage divider between the calibrating adjustment resistor 132 and the differential adjustment resistor 134.

Connection to starting anode 122 of tube 120 is made through lead 124 to a movable contact 137 on the differential adjustment resistor 134.

When the relay 140 has its relay winding 141 energized a plate to cathode potential is placed across tube 120 by the following circuit: from power lead 108 through lead 125, arm 151, movable contact 150, fixed contact 152, lead 126, cathode 123, plate 121, lead 127, relay winding 142, and lead 128 to power lead 109.

Operation of modification of Figure 2

The operation of the circuit shown in Figure 2 is as follows.

When the relative humidity decreases, the resistance of the relative humidity element 135 is increased and raises the potential of the starting anode 112 with respect to cathode 113 in tube 110. When the potential of the starting anode 112 is sufficiently positive with respect to the potential on cathode 113, tube 110 will be energized.

Energization of tube 110 energizes winding 141 and breaks the connection between contacts 145 and 146 and makes connection between contacts 146 and 148. Energization of relay winding 141 also makes connection between relay contacts 150 and 152.

Upon making connection between contacts 146 and 148 a holding circuit is established to retain the energization of relay winding 141. This circuit extends from power lead 108 through lead 114, relay winding 141, lead 115, arm 147, movable contact 146, fixed contact 148, lead 153, and resistor 154, to power lead 109. Resistor 154 limits the amount of current which may flow through relay winding 141 when the relay is energized so as to be easily "bucked" by the current through winding 142 when tube 120 fires.

As a result of movable contact 146 breaking connection with fixed contact 145, the circuit energizing tube 110 is broken and tube 110 is thus deenergized.

When the relay winding 141 is energized movable contact 150 makes connection with fixed contact 152 to energize the load 28 from the line by the following circuit: from line voltage lead 108 through lead 125, contacts 150 and 152, lead 126, load 28, and lead 129 to power lead 109, and in addition places a potential across the plate and cathode in tube 120 by means of the following circuit: from power lead 108 through lead 125, contacts 150 and 152, lead 126, cathode 123, anode 121, lead 127, relay "bucking" winding 142 and lead 128 to power lead 109. Thus, tube 120 is in a position to fire when the relative humidity element 135 has been decreased in resistance sufficiently due to operation of load 28 on the humidity condition to permit starting anode 122 to assume that potential with respect to cathode 123 that the tube may fire.

When the tube 120 is energized, relay winding 142 is energized and the effect is to neutralize the energization of winding 141, permitting the movable contacts 146 and 150 to move from their energized position to their deenergized position. This breaks the circuit to tube 120 to deenergize this tube and also deenergize the "bucking" winding 142. Also, when movable contact 146 breaks connection with fixed contact 148 relay winding 141 is deenergized and tube 10 is again in a position to fire upon application of a proper signal to starting anode 112. As the potential on the starting anode 112 in tube 110 is now too low to permit energization of tube 110 the entire circuit is again in its original completely deenergized position.

Figure 3:
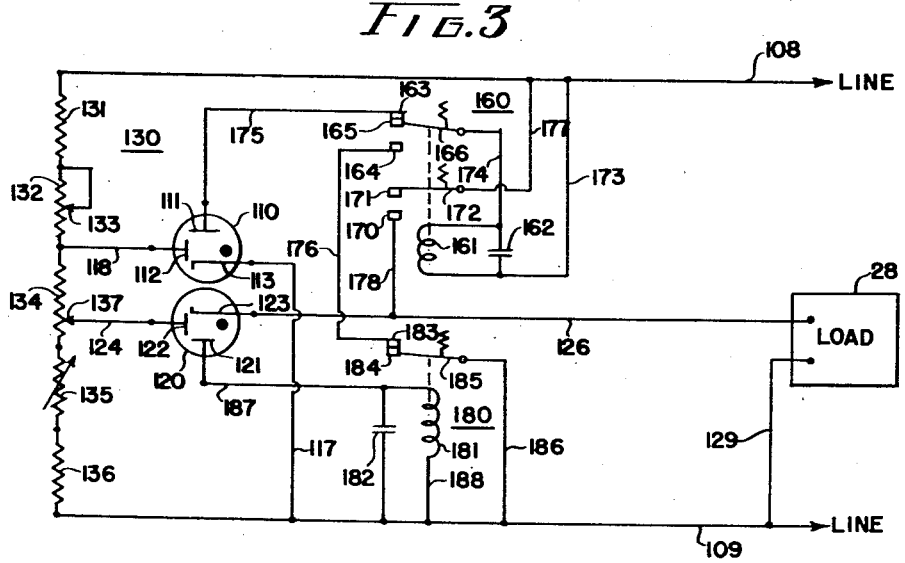
Figure 3 shows a modification of the invention utilizing separate tubes and separate relays for energization and deenergization of the controlled circuit.

Modification of Figure 3

Figure 3 is quite similar to Figure 2 in that it has two gas filled tubes and a voltage divider all of which may be noted by the same reference numerals as has been done. The major difference, however, is that whereas in Figure 2 the circuit uses but one relay having two windings, one of which is a "bucking" winding, in Figure 3 two relays are used.

Relay 160 has a winding 161 and a condenser 162 in parallel therewith to retain energization of winding 161 during the time it takes for movable contact 165 to move from contact 163 to contact 164. Two fixed contacts, 163 and 164, have a movable contact 165 on an arm 166 moving therebetween. Movable contact 165 makes connection with contact 164 when winding 161 is energized and is biased to make connection with contact 163 when the winding is deenergized. A contact 171 on arm 172 makes connection with fixed contact 170 when the relay winding 161 is energized and is biased out of engagement with contact 170 to separate therefrom upon deenergization of winding 161.

A second relay 180 has a relay winding 181 and a condenser 182 in parallel therewith to hold winding 181 energized during alternate half cycles when tube 120 is not conducting. A movable contact 184 on an arm 185 is biased to make contact with a fixed contact 183 when the relay 180 is in the deenergized position and is separated therefrom when the relay is energized.

When the circuit shown in Figure 3 is in the deenergized position as shown in the drawing a potential is placed across the tube 110 in the following manner: from power lead 108 through lead 173, relay winding 161, lead 174, arm 166, movable contact 165, fixed contact 163, lead 175, plate 111, cathode 113 and lead 117 to power lead 109.

Operation of the modification of Figure 3

The operation of the circuit shown in Figure 3 is as follows:

When the relative humidity is decreased to such value that the resistance of the relative humidity element 135 is increased to drive the potential on the starting anode 112 of tube 110 sufficiently positive with respect to the potential or cathode 113, tube 110 will fire.

When tube 110 is energized relay winding 161 is energized and movable contact 165 breaks connection with fixed connection 163 and makes connection with fixed contact 164. Movable contact 171 also makes connection with fixed contact 170. Condenser 162 retains energization of relay winding 161 during the time it takes for movable contact 165 to move from fixed contact 163 to contact 164.

Relay winding 161 is then energized through the following holding circuit: from power lead 108 through lead 173, winding 161, lead 174, arm 166, movable contact 165, fixed contact 164, lead 176, fixed contact 183, movable contact 184, arm 185 and lead 186, to power lead 109. A potential is also placed across the tube 120 by the following circuit: from power lead 108 through lead 177, arm 172, movable contact 171, fixed contact 170, lead 178, lead 126, cathode 123, plate 121, lead 187, relay winding 181, and lead 188 to power lead 109.

Breaking of the connection between contacts 163 and 164 opens the energizing circuit of tube 110 and the tube ceases firing. Relay winding 161, however, remains energized through the holding circuit above recited. Load 28 is now energized by the following circuit: from power lead 108 through lead 177, contacts 171 and 170, leads 178 and 126, load 28 and lead 129 to power lead 109.

When the relative humidity has increased to such an extent due to operation of load 28 that starting anode 122 is sufficiently positive with respect to cathode 123 in tube 120, tube 120 will be energized and energize relay winding 181 of relay 180.

Energization of relay winding 181 breaks the connection between fixed contact 183 and movable contact 184. This breaks the holding circuit for energizing relay winding 161 in relay 160. Upon deenergization of relay winding 161 movable contacts 165 and 171 move to their deenergized position. When movable contact 171 breaks connection with fixed contact 170 the circuit to tube 120 is broken and deenergizes tube 120 and thus relay winding 181 and the entire circuit is then again in its original completely deenergized position.

Modification of Figure 4

In the circuit of Figure 4 a voltage divider provides the signal for a single gas filled tube which, when first energized, energizes a first of two relays. Energization of this relay closes an energizing circuit to a load, establishes a holding circuit for the relay winding, and reverses the connections of the tube with respect to the line and, thus, to the voltage divider. The reversal of connections deenergizes the tube until the controlling point of the voltage divider reaches a new predetermined value to cause the tube to fire again and energize the second relay which breaks the holding circuit for the first relay so that the first relay is deenergized, reversing the tube connections back to their original position and resulting in the circuit in again resuming its original completely deenergized position.

In this modification a voltage divider having a differential adjusting resistor 200, a calibration resistor 201 and a control element 202, considered in the following description as a humidity control element, is connected through limiting resistors 203 and 204 to a source of line voltage, not shown, as follows: from line voltage lead 205 through conductors 206 and 207, limiting resistor 203, differential adjusting resistor 200, calibration resistor 201, humidity control element 202, limiting resistor 204, and conductors 210, 211 and 212 to line voltage lead 213.

Differential adjusting resistor 200 has a wiper arm 214 connected to one terminal of the resistor to by-pass a portion of the resistance if desired. Balancing resistor 201 has a wiper arm 215 connected to one terminal of the resistor to by-pass a portion of this resistance if so desired.

The junction between resistor 201 and control element 202 is the controlling point and is connected to a starting anode 216 of a gas filled grid-glow type of tube 217 through a conductor 220. In addition to starting anode 216 the grid-glow tube 217 has an anode 221 and a cathode 222.

A first relay 223 and a second relay 224 are also in the circuit. Relay 223 has an energizing coil 225 across which is connected a resistor 226 and a condenser 227 for purposes to be described later. Relay 223 has a movable contact 230 operating between fixed contacts 231 and 232, a movable contact 233 operating between fixed contacts 234 and 235, a movable contact 236 operating between fixed contacts 237 and 240, and a movable contact 241 operating between fixed contacts 242 and 243.

The relay 224 has an energizing coil 244 across which are connected a resistor 245 and a condenser 246 in series for purposes to be described later. Relay 224 also has a movable contact 247 operating between fixed contacts 250 and 251. A load 252 is energized upon proper operation of the circuit. This load may be of the same type as load 28 shown in the circuit of the first three figures wherein energization of the load causes it to operate to increase the humidity affecting the humidity control element 202.

*Operation of the modification of Figure 4*

With the elements in the position shown, the tube 217 is connected across the line from lead 205 through conductor 270, fixed contact 250, movable contact 247, conductor 262, movable contact 241, fixed contact 242, conductor 263, anode 221, cathode 222, conductors 265 and 266, relay winding 225 in parallel with resistor 226 and condenser 227, and conductors 267, 211 and 212. When the resistance of the control element 202 has become sufficiently great the resulting voltage on the starting anode 216 of tube 217 causes tube 217 to fire and energize relay coil 225 through the circuit just traced. Upon operation of tube 217 relay coil 225 of relay 223 is energized to move the movable contacts 230, 233, 236, and 241 from their deenergized position against fixed contacts 231, 234, 237 and 242, respectively, to their energized position against fixed contacts 232, 235, 240, and 243. Firing of tube 217 charges up condenser 227. When tube 217 is deenergized the condenser discharges through relay winding 225 to hold the winding energized until the movable contacts have moved to their energized positions.

When relay winding 225 is energized the movable contacts move to their energized positions as above described and the load 252 is then energized from line voltage lead 205 through conductors 206 and 253, movable contact 230, fixed contact 232, conductor 254, load 252, and conductor 271 to line voltage lead 213.

At the same time relay winding 225 remains energized by utilizing its own holding circuit wherein movable contact 241 makes connection with fixed contact 243. Relay winding 225 is then energized as follows: from line voltage lead 205 through conductor 270, fixed contact 250, movable contact 247, conductor 262, movable contact 241, fixed contact 243, conductors 264, and 266, relay winding 225, and conductors 267, 211 and 212 to line voltage lead 213.

Movable contact 233 moves from fixed contact 234, opening the shorting circuit around differential adjusting resistor 200, and against fixed contact 235 which is electrically isolated from the remainder of the circuit.

Anode 221 of tube 217, which was originally connected to line voltage lead 205 through lead 270, contacts 250 and 247, lead 262, contacts 241 and 242 and lead 263 is now connected to line voltage lead 213 through leads 212 and 266, relay winding 244, lead 257, contacts 236 and 240 and leads 261 and 263 while the cathode 222 which was originally connected to line voltage lead 213 through leads 212, 211 and 267, relay winding 225 and leads 266 and 265 is now effectively connected to line voltage lead 205 through lead 270, contacts 250 and 247, lead 262, contacts 241 and 243 and leads 264 and 265.

Upon this reversal of the tube connections tube 217 is deenergized and will remain deenergized as long as the control element retains the same value of impedance which it has to cause original firing of the tube. As a result relay winding 244 remains deenergized.

Upon the humidity control element 202 attaining a second predetermined value due to operation of the energized load in changing the humidity affecting the element 202 the potential of the starting anode 216 of tube 217 is such as to cause tube 217 to fire thus energizing relay winding 244 of relay 224 and charging up condenser 246. Energization of relay winding 244 causes movable contact 247 to break connection with fixed contact 250 and move against fixed contact 251. During the time it takes for the movable contact to move from its deenergized to its energized position condenser 246 discharges through relay winding 244 to keep the winding momentarily energized. As was noted previously the connection between fixed contact 250 and movable contact 247 forms a part of the holding circuit for relay winding 225. With the energization of relay winding 244 this connection is broken and relay winding 225 is deenergized, permitting movable contacts 230, 233, 236, and 241 to move from their energized position against fixed contacts 232, 235, 240 and 243, respectively, to their deenergized positions against fixed contacts 231, 234, 237 and 242.

With the breaking of the connection between movable contact 230 and fixed contact 232 the energizing connection to the load 252 is broken while the making of the connection between movable contact 233 and fixed contact 234 again places an effective short circuit across the differential adjusting resistor 200. The movement of movable contacts 236 and 241 to their deenergized position again reverses the connections of anode 221 and cathode 222 to the line voltage leads so that the energization of tube 217 is now the same as it was originally. Breaking of the connection between movable contact 236 and fixed contact 240 also breaks the energizing circuit of relay winding 244 to deenergize relay 224. The breaking of the connection between movable contact 241 and fixed contact 243 also breaks the holding circuit for energizing relay winding 225 and thus relay 223 is deenergized.

Because of the potential placed on starting anode 216 due to the instant condition of humidity and its effect upon humidity control element 202 tube 217 is also deenergized and the

Modification of Figure 5

The circuit of Figure 5 is similar to that of Figure 4 with the major difference being that whereas in the circuit of Figure 4 the tube connections to the line were reversed in the instant circuit it is the voltage divided connections to the line which are reversed.

In Figure 5 a voltage divider is made up of a calibration resistor 280, a differential adjusting resistor 281 and a control element 282 again considered for description purposes as a humidity control element. Wiper arm 283 moves along calibration resistor 280 and is connected to one terminal of calibration resistor 280 while differential adjusting resistor 281 has a wiper arm 284 connected to one terminal of the resistor and traversing the length thereof. Differential adjusting resistor 281 and humidity control element 282 are connected together through a conductor 285.

The junction between resistor 281 and control element 282, as represented by conductor 285, is connected to a starting anode 286 of a gas filled grid-glow type of tube 287 through a conductor 290. Gas tube 287 also has, in addition to starting anode 286, an anode 291 and a cathode 292.

A first relay 293 and a second relay 294 are also included in the circuit.

Relay 293 has a relay winding 295 in parallel with a resistor 296 and a condenser 297 and operates five movable contacts 300, 301, 302, 303 and 304, which in their deenergized position make connection with fixed contacts 305, 307, 309, 311 and 313 respectively, and in their energized position make connection with fixed contacts 306, 308, 310, 312 and 314.

Relay 294 has a relay winding 315 in parallel with a resistor 316 and a condenser 317 for purposes to be described later. Relay 294 also has a movable contact 320 which in its deenergized position makes connection with fixed contact 321 while in its energized position it makes connection with fixed contact 322. The circuit is energized from line voltage leads 323 and 324. A load 325 having terminals 326 and 327 is energized upon proper operation of this circuit. Load 325 may be such as to decrease the humidity affecting element 282 upon energization of the load.

The voltage divider comprising resistors 280 and 281 and control element 282 is energized from the line as follows: from power lead 323 through leads 330 and 331, direct voltage blocking condenser 332, lead 333, movable contact 302, fixed contact 309, leads 334 and 335, resistors 280 and 281, lead 285, control element 282, leads 336 and 337, fixed contact 311, movable contact 303, lead 340, direct voltage blocking condenser 341, and leads 342, 343 and 344 to line voltage lead 324.

In the particular modification shown, the load 325 is shown to be energized when the circuit is in its generally deenergized position as shown. The energizing circuit for the load 325 is as follows: from line voltage lead 323 through leads 330 and 345, movable contact 300, fixed contact 305, and lead 346 to terminal 326 of load 325, terminal 327 of load 325, and lead 347 to line voltage lead 324.

Tube 287 is operatively connected across the line as follows: from line voltage lead 323, through lead 350, relay winding 295 in parallel with resistor 296 and condenser 297, lead 351, movable contact 304, fixed contact 313, lead 352, anode 291, cathode 292, and leads 353, 343 and 344 to line voltage lead 324.

Operation in the modification of Figure 5

As is shown in the drawing the terminal of resistor 280 connected to lead 335 is connected to line voltage lead 323 and the terminal of control element 282 connected to lead 336 is connected to line voltage lead 324 while plate 291 of tube 287 is connected to line voltage lead 323 and the cathode 292 is connected to line voltage lead 324 through circuits previously traced.

When the impedance value of control element 282 reaches such a value due to the humidity condition as to cause the potential on starting anode 286 to reach a given predetermined value, tube 287 fires, causing energization of relay winding 295, positioned in the anode circuit of the tube.

Energization of relay winding 295 causes the movable contacts 300, 301, 302, 303 and 304 to move to their energized position against fixed contacts 306, 308, 310, 312, and 314. Movement of movable contact 300 from fixed contact 305 to fixed contact 306 breaks the energization circuit to the load 325 and thus the load is no longer energized.

Movement of movable contact 301 away from fixed contact 307 against fixed contact 308 completes a short circuit across the differential adjusting resistor 281 through lead 354 connected to one terminal of resistor 281, contacts 301 and 308 and lead 355 connected to the other terminal of resistor 281, and thus changes the potential across the various components remaining in the voltage divider.

Movement of movable contact 302 away from fixed contact 309 breaks the circuit between the calibration resistor 280 to line voltage lead 323, previously traced, while movement of movable contact 303 against fixed contact 312 makes the connection between calibration resistor 280 and line voltage lead 324 through leads 335 and 356, contacts 312 and 303, lead 340, blocking condenser 341 and leads 342, 343 and 344. The movement of movable contact 303 away from fixed contact 311 breaks the connection between control element 282 and line voltage lead 324, previously traced, while movement of movable contact 302 against fixed contact 310 makes a connection between control element 282 and line voltage lead 323 through leads 336 and 357, contacts 310 and 302, lead 333, blocking condenser 332 and leads 331 and 330. It is thus seen that the connections between the voltage divider and the line voltage leads are reversed upon energization of relay winding 295.

Movement of movable contact 304 away from fixed contact 313 breaks the energizing circuit to relay winding 295 momentarily but because of the charge which has been built up upon condenser 297 during the firing of tube 287, the relay winding 295 remains momentarily energized. This is because condenser 297 discharges through resistor 296 and relay winding 295 when the charging circuit to condenser 297 has been broken. When movable contact 304 breaks connection with fixed contact 313 it makes connection with fixed contact 314 and thus relay winding 295 is energized from the line voltage leads by the following circuit: from line voltage lead 323 through lead 350, relay winding 295 in parallel with condenser 297 and resistor 296, lead 351, movable contact 304, fixed contact 314, lead 362, fixed contact 321, movable contact 320 of relay 294, and leads 363 and 344 to line voltage lead 324. It is thus seen that relay winding 295 has a holding circuit which utilizes a pair of contacts energized by the relay winding itself.

Tube 287 now has a potential placed across its anode and cathode by the following circuit: from line voltage lead 323 through leads 330 and 345, movable contact 300, fixed contact 306, lead 361, relay winding 315 in parallel with resistor 316 and condenser 317, leads 350 and 352, anode 291, cathode 292, and leads 353, 343, and 344 to line voltage line lead 324. Tube 287 is deenergized due to the time which elapsed between the breaking of movable contact 304 with fixed contact 313 and the making of connection between movable contact 300 and fixed contact 306. Because of the changed potential on starting anode 286 due to the reversal of the voltage divider with respect to the line voltage leads the tube is not reenergized immediately. It is seen, however, that relay winding 315 is now in a position to be energized upon the firing of the tube in that it is now in the anode circuit of tube 287.

When the control element 282 attains a new impedance value due to the increased humidity affecting element 282 upon non-operation of the load such as places the potential on starting anode 286 to the given predetermined value with respect to the potential on cathode 292 as will cause the tube to fire, tube 287 fires a second time.

Upon firing of tube 287 relay winding 315 is energized and a charge is built up on condenser 317 in parallel with the relay winding 315.

Energization of relay winding 315 causes movable contact 320 to break connection with fixed contact 321 and make connection with fixed contact 322.

The breaking of the connection between movable contact 320 and fixed contact 321 breaks the holding circuit for relay winding 295 and causes deenergization of relay 293, resulting in movable contacts 300, 301, 302, 303 and 304 moving to their deenergized position.

As movable contact 300 breaks connection with fixed contact 306, the energizing circuit for relay winding 315 is broken but the charge which is then built up upon condenser 315 discharges through resistor 316 and relay winding 315 to hold it momentarily in energization after the connection between movable connection 300 and fixed contact 306 is broken.

When movable contact 300 breaks connection with fixed contact 306 the energizing circuit to tube 287 is also broken while the movement of movable contacts 302 and 303 to their deenergized positions again reverse the connections of the voltage divider with respect to the line voltage leads so that the connection between the voltage divider and the line is now just as it was originally. The breaking of the energizing circuit for tube 287 causes tube 287 to cease firing while the new potential placed on starting anode 286 due to the reversal of the voltage divider with respect to the electrodes of the tube prevents tube 287 from again firing immediately. Relay winding 295 is now again in the anode circuit of tube 287 and because this tube is not firing the relay winding 295 remains deenergized while, as has been pointed out above, relay winding 315 is also deenergized due to the breaking of its energizing circuit. Due to the connection made between contacts 300 and 305 the load 225 is again energized across the line.

It is thus seen that the circuit has passed through a complete cycle of operation which in brief is as follows: firing of tube 287 causes energization of relay 293 which reverses the connections of the voltage divider to the line voltage leads and causes deenergization of tube 287. A second firing of tube 287 causes energization of relay 294 which results in deenergization of relay 293 causing the connection between the voltage divider and the line voltage leads to resume their original position and deenergize tube 287 and relays 293 and 294.

While I have shown and described five specific embodiments or modifications of my invention it will be understood that these are for purposes of illustration only and that my invention is to be claimed only by the scope of the appended claims.

I claim as my invention:

1. In combination: a condition responsive device connected across a source of alternating voltage; electron discharge means connected across the source of alternating voltage; a controlled circuit; means operatively connecting said discharge means to said controlled circuit to control the energization thereof; input circuit means operatively connecting said condition responsive device to said discharge means so that upon the condition affecting the condition responsive device assuming a first predetermined value the discharge means is so energized as to connect said controlled circuit across the source of alternating voltage for energization of said controlled circuit; means effective, upon energization of said discharge means, to cause deenergization of said discharge means while retaining said controlled circuit in the energized condition independently of the deenergization of said discharge means; and means effective, upon said controlled circuit being energized and the condition controlling said condition responsive device assuming a second predetermined value, to cause said discharge means to be so energized as to deenergize both said controlled circuit and said discharge means.

2. In combination: a voltage divider containing a variable impedance; electron discharge means; a controlled device; means operatively connecting said controlled device to said discharge means to control the energization of said controlled device; means operatively connecting said voltage divider to said discharge means so that upon the voltage across said variable impedence assuming a first predetermined value the discharge means is so energized as to energize said controlled device; means effective, upon energization of said discharge means, to cause deenergization of said discharge means while retaining said controlled device energized independently of the deenergization of said discharge means; and means effective, upon the voltage across said variable impedance assuming a second predetermined value, to so energize said discharge means as to deenergize both said controlled device and said discharge means.

3. In combination: a condition responsive device having a continually varying impedance value dependent upon a condition to be controlled; electron discharge means; a controlled device for controlling the condition affecting the condition responsive device; means operatively connecting said discharge means to said controlled device to control the energization thereof; means operatively connecting said condition responsive device to said discharge means so that upon the condition responsive device being caused to assume a first predetermined value the discharge means is so energized as to energize said controlled device and effect a changing of the condition affecting the condition responsive device; means effective, upon energization of said discharge means, to cause deenergization of said discharge means while retaining said controlled device, energized independently of the deenergization of said discharge means; and means effective, upon said controlled device being energized and said condition responsive device being caused to assume a second predetermined value, to cause said discharge means to be so energized as to deenergize both said controlled device and said discharge means.

4. In combination: a condition responsive device having a continually varying impedance value dependent upon a condition to be controlled connected across a source of alternating voltage; electron discharge means connected across the source of alternating voltage; a controlled device for controlling the condition affecting the condition responsive device; means operatively connecting said discharge means to said controlled circuit to control the energization thereof; means operatively connecting said condition responsive device to said discharge means so that upon the condition responsive being caused to assume a first predetermined value the discharge means is so energized as to connect said controlled device across the source of alternating voltage so as to energize said controlled device and effect a changing of the condition effecting the condition responsive device; means effective, upon energization of said discharge means, to cause deenergization of said discharge means while retaining said controlled device energized independently of the deenergization of said discharge means; and means effective upon said controlled device being energized and said condition responsive device being caused to assume a second predetermined value, to cause said discharge means to be so energized as to deenergize both said controlled device and said discharge means.

5. In combination: a voltage divider containing a variable impedance; a pair of gas filled electron discharge devices; a controlled circuit; means selectively energizing one of said discharge devices from said voltage divider upon the voltage across said variable impedance assuming a predetermined value; means selectively energizing the other of said discharge devices from said voltage divider upon the voltage across said impedance assuming a second predetermined value; means operatively connecting said devices to said circuit in such a manner that said circuit is energized upon energization of one of said devices and is deenergized upon energization of the other of said devices; and means operatively connected to said devices to cause deenergization of said devices upon energization thereof.

6. In combination: a source of signal voltage; a first and a second electron discharge device; a controlled circuit; input circuit means electrically connecting said source to said discharge devices in such a manner that, upon said signal voltage assuming a first predetermined value, said first discharge device is energized; means so operatively connecting said first discharge device and said controlled circuit that, upon energization of said first device, said controlled circuit is energized, deenergizing said first device and establishing a holding circuit effective independently of the deenergization of said first device for continuing energization of said controlled circuit; and means, including said input circuit means, effective, upon said controlled circuit being energized and said signal voltage assuming a second predetermined value, to energize said second discharge device and effect deenergization of said controlled circuit and said discharge device.

7. In combination: a voltage divider containing a variable impedance; a first and a second electron discharge device; a first relay winding; a second relay winding; a controlled device; means so connecting said first discharge device to said voltage divider that upon the voltage across said variable impedance assuming a first predetermined value said first discharge device is energized; means so operatively connecting said first relay winding to said first discharge device and to said controlled device that said first relay winding is energized upon energization of said first discharge device to energize said controlled device, deenergize said first discharge device, and retain energization of said first relay winding independently of said first discharge device; means so connecting said second discharge device to said voltage divider that upon the voltage across said variable impedance assuming a second predetermined value and said first relay winding being energized said second discharge device is energized; and means so operatively connecting said second relay winding to said second discharge device and to said first relay winding that said second relay winding is energized upon energization of said second discharge device to deenergize said first relay winding, and thus said controlled device, said second relay winding, and said second discharge device.

8. The combination as claimed in claim 7 wherein the first relay winding is the primary winding of a relay and the second relay winding is a bucking winding of the same relay so that energization of the second relay winding neutralizes the magnetomotive force produced by the primary winding.

9. In combination: a source of signal voltage; a first and a second electron discharge device; a relay having a first winding and a bucking winding; means so operatively connecting said source and said first device that, upon said signal voltage assuming a first predetermined value, said first device is energized; means so electrically connecting said first device and said first relay winding that energization of said first device causes energization of said first winding; means effective, upon energization of said first winding, to deenergize said first device and establish a holding circuit effective independently of the deenergization of said first device; means so operatively connecting said source and said second device that, upon said signal voltage assuming a second predetermined value, said second device is energized; means so electrically connecting said second device and said bucking winding that energization of said second device causes energization of said bucking winding; and means effective, upon energization of said bucking winding, to deenergize said second device, said first winding and said bucking winding.

10. An electronic circuit having in combination: a source of power; a voltage divider containing a variable impedance; a first and a second gas filled electron discharge device; a relay having a first and a second winding; a load; means energizing said voltage divider from said power source; means electrically connecting said first discharge device across said power source; means electrically connecting said second discharge device across said power source; means electrically connecting said first winding of said relay in series with said first discharge device across said power source; means electrically connecting said second winding of said relay in series with said second discharge device across said power source; means connecting said voltage divider to said devices to apply a signal thereto; means, upon the voltage across said variable impedance assuming a predetermined value and causing energization of said first device and said first winding, closing contacts of said relay to deenergize said first device and continue energization of said first winding independently of the deenergization of said first device; and means, upon the voltage across said impedance assuming a second predetermined value and causing energization of said second device and said second winding, opening the contacts of said relay to deenergize said first winding and said second device.

11. In combination: a voltage divider utilized as a source of signal voltage; a first and a second electron discharge device; a relay having a first and a second winding; means so electrically connecting said voltage divider and said first discharge device that, upon said signal voltage assuming a first predetermined value, said first device is energized; means so electrically connecting said first discharge device and said first winding of said relay that, upon energization of said first device, said first winding is energized; means so operatively connected to said first winding that, upon energization thereof, a holding circuit is effected to retain energization of said first winding; further means so operatively connected to said first relay winding that, upon energization thereof, said first discharge device is deenergized; means so electrically connecting said voltage divider and said second discharge device that, upon said signal voltage assuming a second predetermined value, said second device is energized; means so electrically connecting said second discharge device and said second relay winding that, upon energization of said second device, said second winding is energized; means so operatively connected to said second winding that, upon energization thereof, said holding circuit for said first winding is deenergized; and further means so operatively connected to said second winding that, upon energization thereof, said second device is deenergized, deenergizing said second winding.

12. The combination as claimed in claim 7 wherein the first and the second relay windings are windings of two separate relays and energization of the second relay winding breaks the energizing circuit for said first relay winding.

13. In combination: a voltage divider having a portion thereof comprising a variable impedance; a gas filled electron discharge device; a first relay; a second relay; a source of voltage; means energizing said voltage divider from said source; means operatively connecting said discharge device to said source; means connecting said discharge device to said voltage divider such that said device is energized upon said variable impedance attaining a first predetermined value; means energizing said first relay upon energization of said discharge device; means, effective upon energization of said first relay, to reverse the connections of said device to said source and cause deenergization of said device; means reenergizing said device upon said variable impedance attaining a second predetermined value; means energizing said second relay upon reenergization of said device; and means, effective upon energization of said second relay, to deenergize said first relay and cause the connections of said device to said source to revert to their original positions and further result in deenergization of said second relay.

14. In combination: a voltage divider having a portion thereof comprising a variable impedance; a gas filled electron discharge device; a first relay; a second relay; a source of voltage; means energizingly connecting said voltage divider from said source; means operatively connecting said discharge device to said source; means connecting said discharge device to said voltage divider such that said device is energized upon said variable impedance attaining a first predetermined value; means energizing said first relay upon energization of said discharge device; means, effective upon energization of said first relay, to reverse the energizing connections of said voltage divider to said source and cause deenergization of said device; contact means operated upon by said first relay for closing an energizing circuit, upon energization of said first relay for continuously energizing said first relay; means reenergizing said device upon said variable impedance attaining a second predetermined value; means energizing said second relay upon reenergization of said device; and means effective upon energization of said second relay, to deenergize said first relay and cause the connections of said voltage divider to said source to revert to their original positions and further result in deenergization of second relay.

LAWRENCE J. DAHLINE.

REFERENCES CITED

The following references are of record in the file of this patent:

UNITED STATES PATENTS

| Number | Name | Date |
|---|---|---|
| 1,738,299 | Kille | Dec. 3, 1929 |
| 1,845,321 | Nelson | Feb. 16, 1932 |
| 1,930,517 | Hershey | Oct. 17, 1933 |
| 2,045,450 | Dimond | June 23, 1936 |
| 2,088,548 | Chauveau | July 27, 1937 |
| 2,188,159 | Rockwood | Jan. 23, 1940 |
| 2,227,285 | Stansbury | Dec. 31, 1940 |
| 2,412,092 | Mayle | Dec. 3, 1946 |
| 2,423,115 | Pauliart | July 1, 1947 |

FOREIGN PATENTS

| Number | Country | Date |
|---|---|---|
| 551,058 | Great Britain | Feb. 5, 1943 |